United States Patent
Anderson et al.

(10) Patent No.: US 9,276,943 B2
(45) Date of Patent: Mar. 1, 2016

(54) AUTHORIZING A CHANGE WITHIN A COMPUTER SYSTEM

(71) Applicant: International Business Machines Corporation, Armonk, NY (US)

(72) Inventors: Eric M. Anderson, Friendswood, TX (US); Krishnamohan Dantam, Chelmsford, MA (US); Ravi K. Kosaraju, Pittsford, NY (US)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 14/062,896

(22) Filed: Oct. 25, 2013

(65) Prior Publication Data
US 2015/0121463 A1   Apr. 30, 2015

(51) Int. Cl.
G06F 21/60 (2013.01)
H04L 29/06 (2006.01)

(52) U.S. Cl.
CPC .................................... *H04L 63/12* (2013.01)

(58) Field of Classification Search
None
See application file for complete search history.

(56) References Cited

U.S. PATENT DOCUMENTS

2005/0044367 A1*  2/2005  Gasparini et al. ............. 713/172
2008/0072304 A1*  3/2008  Jennings et al. ................ 726/11
2010/0100970 A1    4/2010  Roy-Chowdhury et al.
2012/0233684 A1*  9/2012  Denis et al. ........................ 726/9
2012/0266224 A1* 10/2012  Gruschka et al. ................. 726/7
2015/0002261 A1*  1/2015  Schiavi et al. ................. 340/5.8

OTHER PUBLICATIONS

M'Raihi et al., "TOTP: Time-Based One-Time Password Algorithm", May 2011, IETF, pp. 1-16.*
Disclosed Anonymously; "Security for Shared Data Spaces", !Room Journal, Jul. 30, 2007, pp. 1-15, The IP.com Prior Art Database, Netherlands, <http://ip.com/IPCOM/000156657>.
M'Raihi et al.; "TOTP: Time-Based One-Time Password Algorithm", May 2011, pp. 1-16, Internet Engineering Task Force (IETF), United States, Copyright 2010 IETF and the persons identified as the document authors, <http://www.rfc-editor.org/rfc/pdfrfc/rfc6238.txt.pdf>.
Turner et al.; "Cryptographic Message Syntax (CMS) Encrypted Key Package Content Type", IP.com Journal, Dec. 14, 2010, pp. 1-22, The IP.com Prior Art Database, United States, Copyright 2010 IETF and the persons identified as the document authors, <http://ip.com/IPCOM/000202352>.

* cited by examiner

*Primary Examiner* — Lisa Lewis
*Assistant Examiner* — Henry Tsang
(74) *Attorney, Agent, or Firm* — John Pivnichny

(57) ABSTRACT

Program code generates on a first computer within a computer system a unique key for a computer software application, wherein the computer software application is on a second computer within the computer system. The program code generates on the first computer an authorization code that grants a designated end user access to implement a change to a configuration item on a second computer during a configurable time period. The program code verifies the authorization code inputted into the second computer to determine if the end user has authority to implement the change on second computer, wherein the authorization code is separated into a first string and a second string each having a fixed number of bits. The program code grants access to the end user to implement the change to the configuration item on the second computer if the end user has the authority to implement the change.

12 Claims, 6 Drawing Sheets

AUTHORIZING A CHANGE WITHIN A COMPUTER SYSTEM

BACKGROUND

1. Field of the Invention

The present invention relates generally to a computer software changes within a computer system, and more particularly to authorizing a change within a computer system by an end user associated with an authorization code.

2. Description of the Related Art

Many businesses have a change management system for tracking changes planned for implementation on a computer system that is being managed by an information technology department (IT department). Typically, prior to the implementation of the change on the computer system a request for the change is made. The request for the change goes through an approval process ensure that the change being requested is valid, and is assigned to the correct person having authority to implement the change. It is known for an end user having the authority to implement the change to log into the computer system, and apply the change on the computer system. The IT department may need to limit the scope of the end user's authority to implement the change on the computer system in order to prevent unauthorized changes, and satisfy service level agreements. However, when granting the end user authority to implement the change the IT department can experience difficulty in limiting the scope of the end user's authority to implement the change.

SUMMARY

Aspects of an embodiment of the present invention disclose a method, computer system, and program product for authorizing a change within a computer system by an end user associated with a change authorization code. A computer generating on a first computer within a computer system a unique key for a computer software application, wherein the computer software application is on a second computer within the computer system and is configured to participate in a change management process implemented via use of change management software on the first computer. The computer generates on the first computer an authorization code that grants a designated end user access to implement a change to a configuration item on a second computer during a configurable time period. The computer verifies the authorization code inputted into the second computer to determine if the end user has authority to implement the change on second computer, wherein the authorization code is separated into a first string and a second string each having a fixed number of bits. The computer grants access to the end user to implement the change to the configuration item on the second computer if the end user has the authority to implement the change.

BRIEF DESCRIPTION OF THE SEVERAL VIEWS OF THE DRAWINGS

The subject matter which is regarded as an embodiment of the present invention is particularly pointed out and distinctly claimed in the claims at the conclusion of the specification. One manner in which recited features of an embodiment of the present invention can be understood is by reference to the following detailed description of embodiments, taken in conjunction with the accompanying drawings in which:

DETAILED DESCRIPTION

Figure 1:
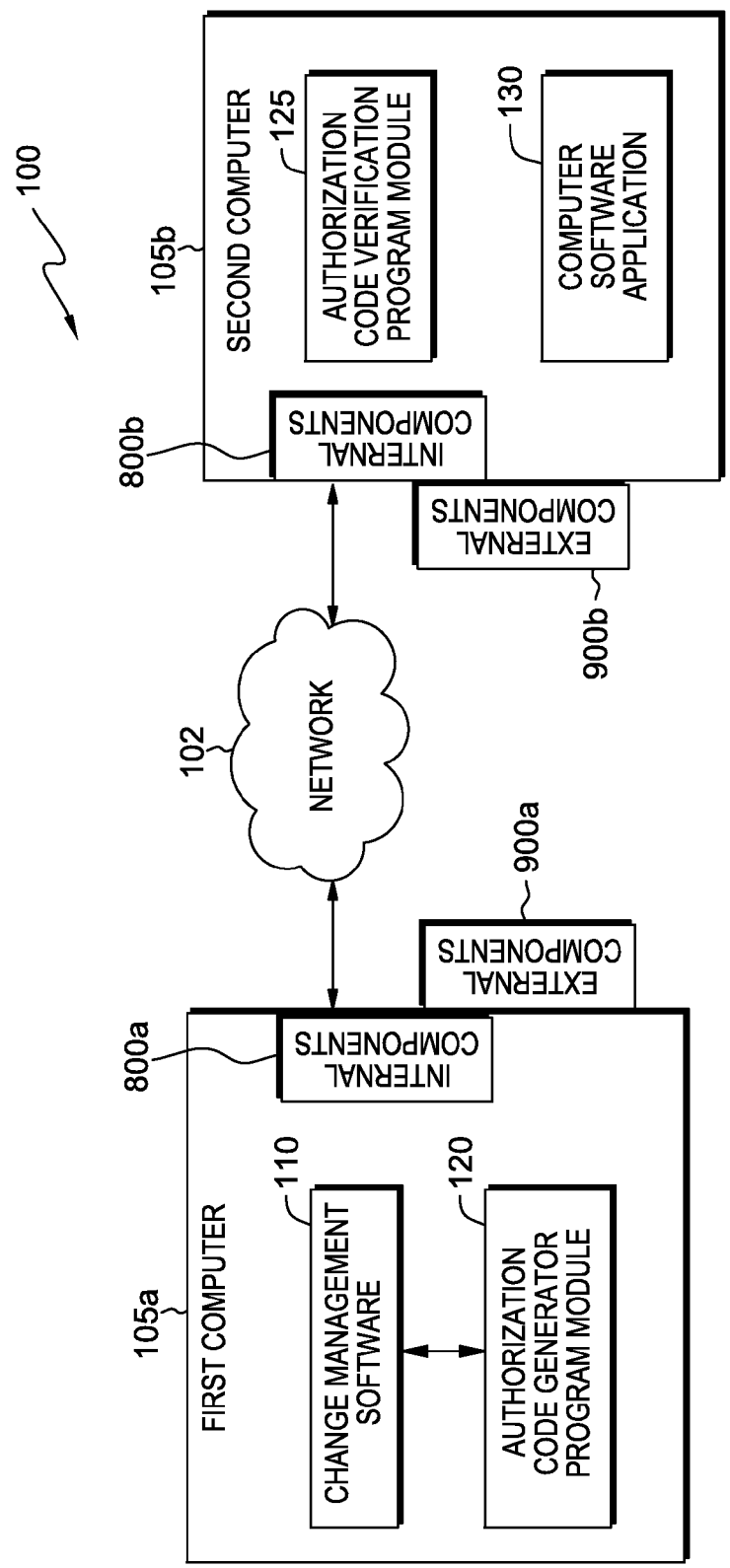
FIG. 1 is a block diagram of a computer system having program code that includes authorization code generator program module installed on a first computer, and authorization code verification program module installed on a second computer according to an embodiment of the present invention.
Figure 2A:
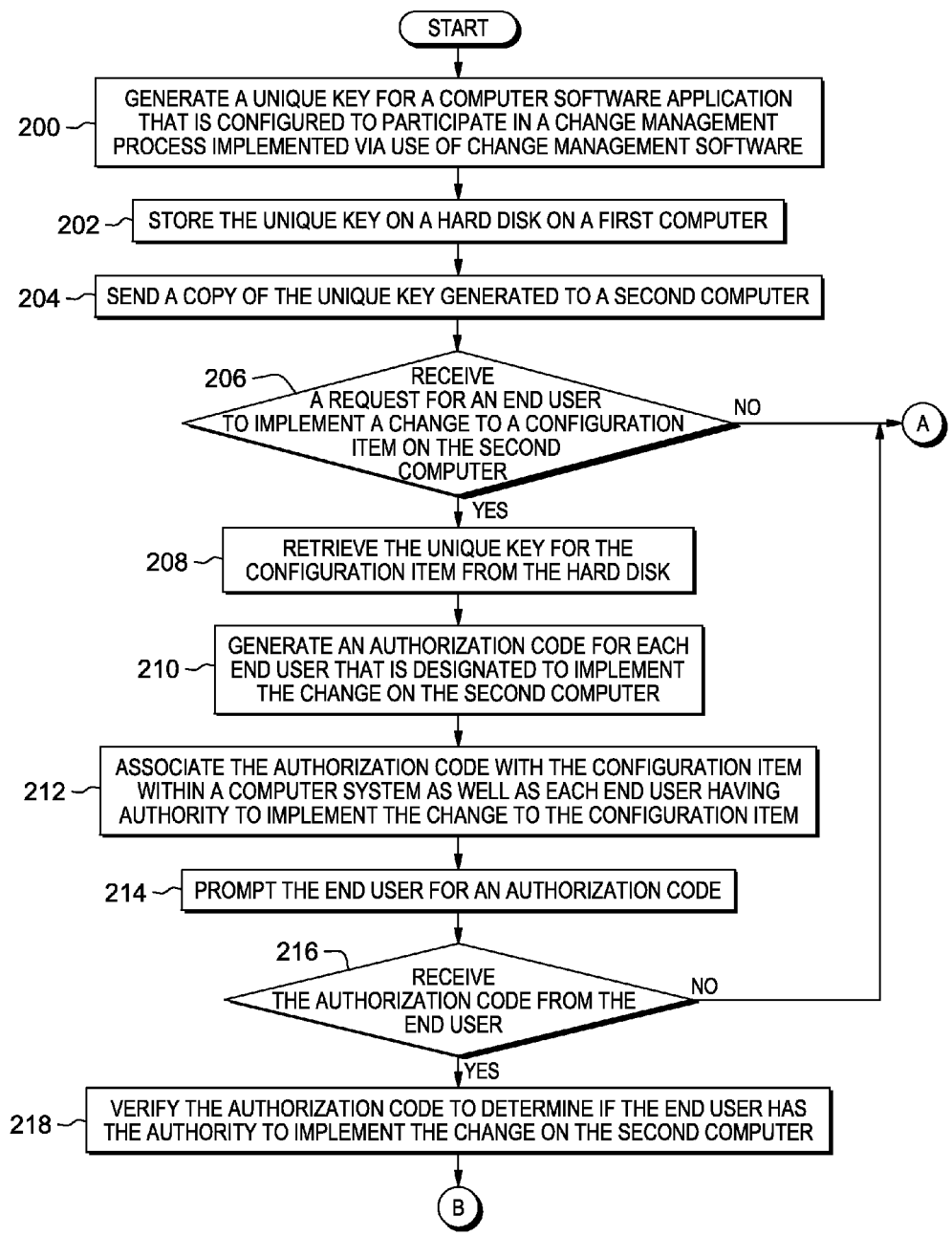
FIGS. 2A-2D are flowcharts illustrating operations of the program code according to an embodiment of the present invention.
Figure 2B:
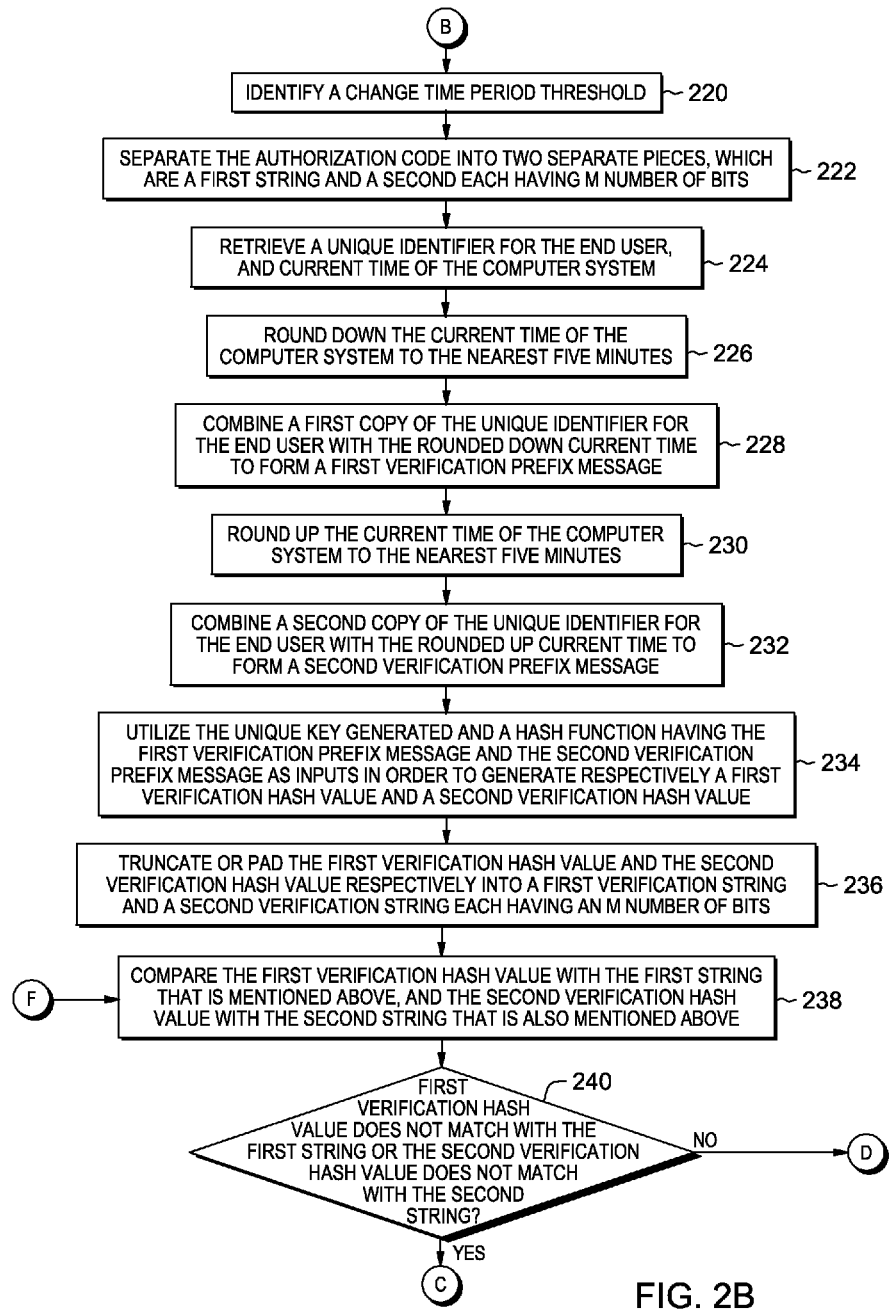
Figure 2C:
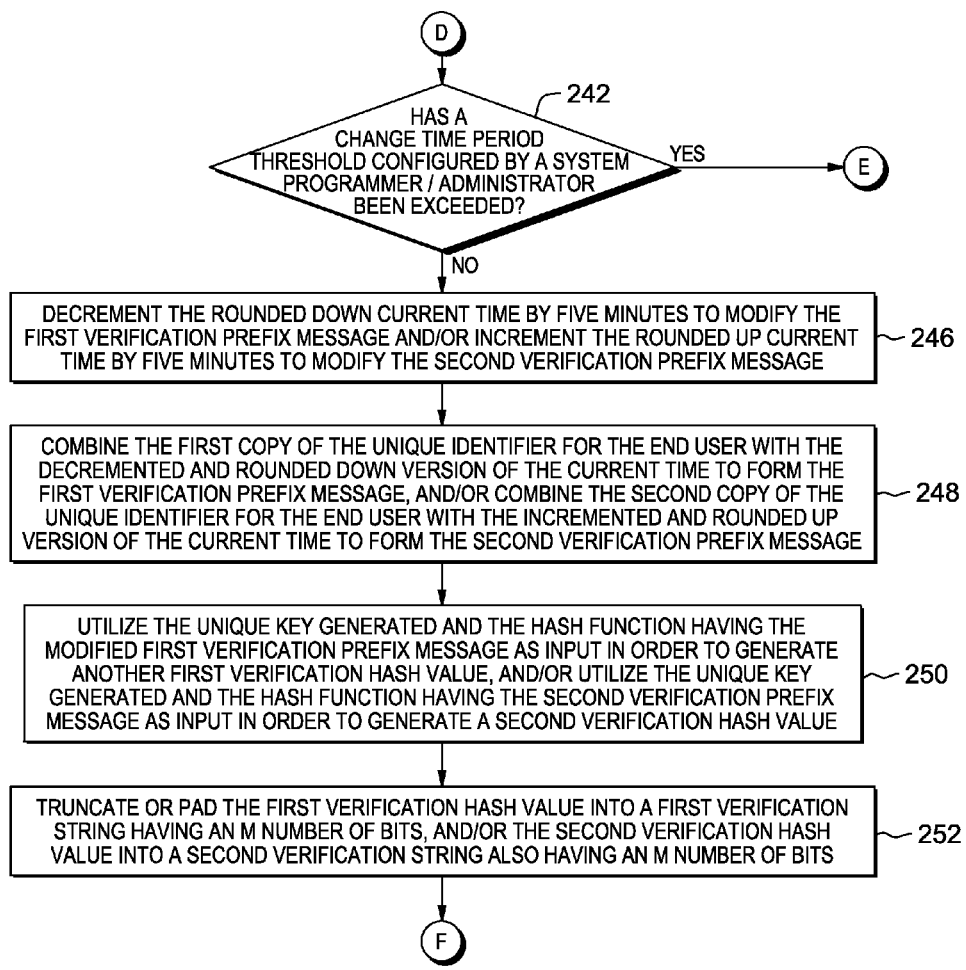
Figure 2D:
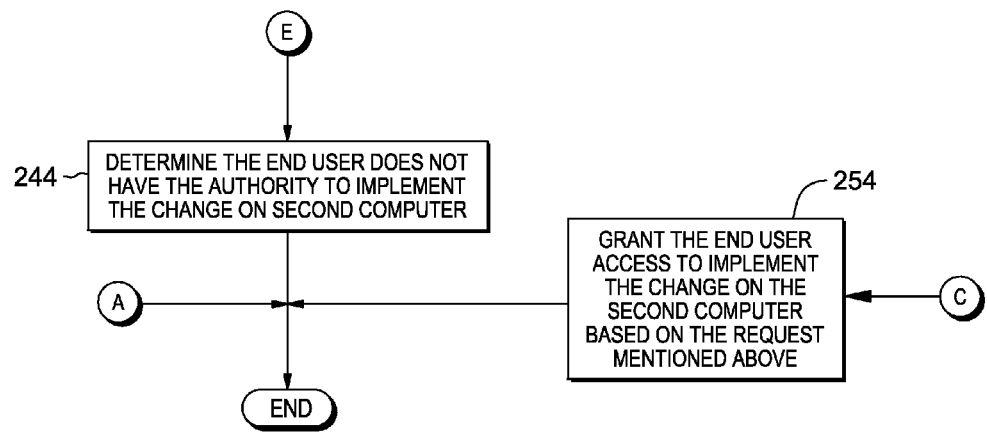

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, Smalltalk, C++ or the like, conventional procedural programming languages such as the "C" programming language, a hardware description language such as VERILOG, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Exemplary embodiments now will be described more fully herein with reference to the accompanying drawings. This disclosure may, however, be embodied in many different forms and should not be construed as limited to the exemplary embodiments set forth herein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

Embodiments of the present invention provide a language translation management program module for authorizing a change within a computer system by an end user associated with a change authorization code.

FIG. 1 illustrates computer system 100 having program code that includes change authorization code generator program module 120 installed on first computer 105a, and authorization code verification program module 125 installed on second computer 105b. First computer 105a is also installed with change management software 110, and second computer 105b is installed with computer software application 130.

Authorization code generator program module 120, mentioned above, can generate a change authorization code (authorization code) in response to receiving a request to implement a change (e.g., software and/or hardware change) within computer system 100, and can associate the authorization code to an end user and a configuration item (i.e., computer software component and/or computer hardware component) that is assigned to a computer having authorization code verification program module 125. In the disclosed embodiment, the configuration item is assigned to second computer 105b, but in other embodiments the configuration item can be assigned to other computers not shown in computer system 100. In particular, the configuration item is a computer software component and/or computer hardware component to which the change, mentioned above, is to be implemented by the end user. To implement the change the end user can enter the authorization code into authorization code verification program module 125, via a user interface of the program code. Based on the authorization code that is entered, authorization code verification program module 125 can determine whether the end user has the authority to implement the change on second computer 105b.

Furthermore, first computer 105a and second computer 105b, within computer system 100, can interact and exchange data (i.e., communicate) with each other via network 102. However, network 102 is not required for the program code, mentioned above, to operate. Moreover, first computer 105a and second computer 105b each include respective internal components 800a and 800b, and respective external components 900a and 900b, as described below in more detail with respect to FIG. 3.

FIGS. 2A-2D are flowcharts illustrating the steps of the program code, authorization code generator program module 120 and authorization code verification program module 125, for authorizing a change within computer system 100 by an end user associated with an authorization code. Program modules 120 and 125 of the program code are installed on respective computers 105a and 105b as shown in FIG. 1.

In the disclosed embodiment, the program code on first computer 105a generates a unique key for computer software application 130 (i.e., for each computer software and/or computer hardware component) that is configured to participate in a change management process implemented via use of change management software 110 (block 200). Specifically, the program code on first computer 105a for setup purposes generates a unique key (i.e., a shared symmetric cryptographic key that is generated randomly). Next, the program code stores the unique key on a hard disk on first computer 105a (block 202), and sends a copy of the unique key generated to second computer 105b (block 204). If the program code on first computer 105a does not receive a request for an end user to implement a change on second computer 105b (the "NO" branch of decision block 206), then the program code ends. However, in the disclosed embodiment, the program code on first computer 105a receives a request for an end user to implement a change to a configuration item on second computer 105b (the "YES" branch of decision block 206), and retrieves the unique key for the configuration item from the hard disk (block 208). Specifically, in the disclosed embodiment, the configuration item is computer software application 130 on second computer 105b. However, in other embodiments the configuration item can be a computer software application on another computer within computer system 100 (not shown). Moreover, the request mentioned above includes at least the following parameters: a unique identifier for the end user, a start time to apply the change, and an end time to apply the change.

Next, the program code on first computer 105a generates an authorization code for each end user that is designated to implement the change on second computer 105b (block 210). Specifically, the program code on first computer 105a generates the authorization code based on the following three input parameters: the unique identifier for the end user, the start time of the change, and the end time of the change that are provided automatically within the request. In other embodiments, the three input parameters can be provided as input into the program code via manual entry by a system programmer/administrator.

For example, to generate the authorization code, the program code retrieves the unique identifier for the end user, the start time of the change, and the end time of the change. Next, the program code rounds the start time of the change down to the nearest five minutes, and rounds the end time of the change up to the nearest five minutes. The program code then combines a copy of the unique identifier for the end user with the rounded start time of the change in order to form a first prefix message, and separately combines a copy of the unique identifier for the end user with the rounded end time of the change in order to form a second prefix message. Subsequently, the program code utilizes the unique key generated (i.e., the shared symmetric cryptographic key that is generated randomly) and a hash function having the first prefix message as input in order to generate a first hash value, and also utilizes the unique key generated and the hash function having the second prefix message as input in order to generate a second hash value. Thus, the first hash value and the second hash value are two separate fixed-sized bit strings. Next, the program code truncates or pads (i.e., adjusts) the first hash value into a first string having an M number of bits, and the second hash value into a second string also having an M number of bits. To complete the generation of the authorization code for each end user that is designated to implement the change on second computer 105b, the program code concatenates the first string and the second string to form a third string that is the authorization code having 2M (i.e., M+M=2M) number of bits. The authorization code is valid for a specific computer and an end user during a defined time period (i.e., a fixed change window) that can expire, wherein the defined time period is configured by the system programmer/administrator. Subsequent to generating the authorization code having 2M number of bits, the program code associates the authorization code with the configuration item within computer system 100 as well as each end user having authority to implement the change to the configuration item (block 212).

Next, in response to an end user trying to access (e.g., log into) the configuration item, the program code on second computer 105b prompts the end user for an authorization code (block 214). If the program code on second computer 105b does not receive the authorization code from the end user (the "NO" branch of decision block 216), then the program code ends. Otherwise, if the program code on second computer 105b receives the authorization code from the end user (the "YES" branch of decision block 216), then the program code verifies the authorization code to determine if the end user has the authority to implement the change on second computer 105b (block 218).

In particular, to verify the authorization code the program code on second computer 105b identifies a change time period threshold (block 220). The change time period threshold represents the maximum duration of the fixed change window, which is the system wide upper limit for the change to take place. For example, if the change time period threshold is forty-eight hours then it means all changes must be completed within forty-eight hours. The change time period threshold is configured during install of the program code. Next, the program code on second computer 105b separates the authorization code into two separate pieces, which are the first string and the second each having M number of bits (block 222). Subsequently, the program code on second computer 105b retrieves the unique identifier for the end user, and current time of computer system 100 (block 224). The current time of computer system 100 is defined as the time that is kept by the internal clock of computer system 100. Next, the program code on second computer 105b rounds down the current time of computer system 100 to the nearest five minutes (block 226), and combines a first copy of the unique identifier for the end user with the rounded down current time to form a first verification prefix message (block 228). In addition, the program code on second computer 105b rounds up the current time of computer system 100 to the nearest five minutes (block 230), and combines a second copy of the unique identifier for the end user with the rounded up current time to form a second verification prefix message (block 232). Subsequently, the program code on second computer 105b utilizes the unique key generated and a hash function having the first verification prefix message and the second verification prefix message as inputs in order to generate respectively a first verification hash value and a second verification hash value (block 234). Thus, the first verification hash value and the second verification hash value are two separate fixed-sized bit strings. Next, the program code on second computer 105b truncates or pads (i.e., adjusts) the first verification hash value and the second verification hash value respectively into a first verification string and a second verification string each having an M number of bits (block 236).

Subsequently, the program code on second computer 105b compares the first verification hash value with the first string that is mentioned above, and the second verification hash value with the second string that is also mentioned above (block 238). Next, if the first verification hash value does not match with the first string or the second verification hash value does not match with the second string (the "NO" branch of decision block 240), then the program code on second computer 105b determines whether a change time period threshold configured by the system programmer/administrator has been exceeded (decision block 242). The change time period threshold represents the maximum duration of the fixed change window, wherein the fixed change window is an upper limit for a change to take place within computer system 100. The change time period threshold is exceeded if either the total cumulative value of decrements to the rounded down current time in block 246 or total cumulative value of increments to the rounded up current time in block 246 is greater than the change time period threshold. If the change duration threshold parameter value has been exceeded (the "YES" branch of decision block 242), then the program code determines the end user does not have the authority to implement the change on second computer 105b (block 244). Subsequently, the program code ends.

Otherwise, if the change duration threshold parameter value has not been exceeded (the "NO" branch of decision block 242), then the program code on second computer 105b decrements the rounded down current time by five minutes to modify the first verification prefix message and/or increments the rounded up current time by five minutes to modify the second verification prefix message (block 246). Specifically, the program code on second computer 105b decrements the rounded down current time by five minutes to modify the first verification prefix message if the first verification hash value does not match with the first string, and/or increments the rounded up current time by five minutes to modify the second verification prefix message if the second verification hash value does not match with the second string.

Next, the program code on second computer 105b combines the first copy of the unique identifier for the end user with the decremented and rounded down version of the current time to form the first verification prefix message, and/or combines the second copy of the unique identifier for the end user with the incremented and rounded up version of the current time to form the second verification prefix message (block 248). Specifically, the program code on second computer 105b combines a copy of the unique identifier for the end user with the decremented and rounded down version of the current time if the first verification hash value does not match with the first string, and/or combines a copy of the unique identifier for the end user with the incremented and rounded up version of the current time if the second verification hash value does not match with the second string.

Subsequently, the program code on second computer 105b utilizes the unique key generated and the hash function having the modified first verification prefix message as input in order to generate another first verification hash value, and/or utilizes the unique key generated and the hash function having the second verification prefix message as input in order to generate a second verification hash value (block 250). Thus, the first verification hash value and the second verification hash value are two separate fixed-sized bit strings. Specifically, the program code on second computer 105b utilizes the hash function to generate another first verification hash value if the first verification hash value does not match with the first string, and/or generates a second verification hash value if the second verification hash value does not match with the second string. The hash function is used to verify the authentication code, and includes the following inputs: the unique key generated (i.e., the shared symmetric cryptographic key that is generated randomly), and at least one of the modified first prefix message and the modified second prefix message. The modified first prefix message is a combination of the unique identifier for the end user and the decremented and rounded current time. Likewise, the modified second prefix message is a combination of the unique identifier for the end user and the incremented and rounded current time of the change.

Next, the program code truncates or pads (i.e., adjusts) the first verification hash value into a first verification string having an M number of bits, and/or the second verification hash value into a second verification string also having an M number of bits (block 252). Specifically, the program code on second computer 105b truncates or pads (i.e., adjusts) the first verification hash value into a first verification string having an M number of bits if the first verification hash value does not match with the first string, and/or the second verification hash value into a second verification string also having an M number of bits if the second verification hash value does not match with the second string. Subsequently, the program code on second computer 105b continues to compare the first verification hash value with the first string that is mentioned above, and the second verification hash value with the second string that is also mentioned above (block 238).

Otherwise, if the first verification hash value matches with the first string and the second verification hash value matches with the second string (the "YES" branch of decision block 240), then the program code on second computer 105b grants the end user access to implement the change on second computer 105b based on the request mentioned above (block 254). Next, the program code ends. In the disclosed embodiment, the change on second computer 105b is to apply a software update to a configuration item (e.g., computer software application 130) on second computer 105b. However, in other embodiments, the change can be to apply a computer software update to a configuration item on another computer (not shown) within computer system 100.

Figure 3:
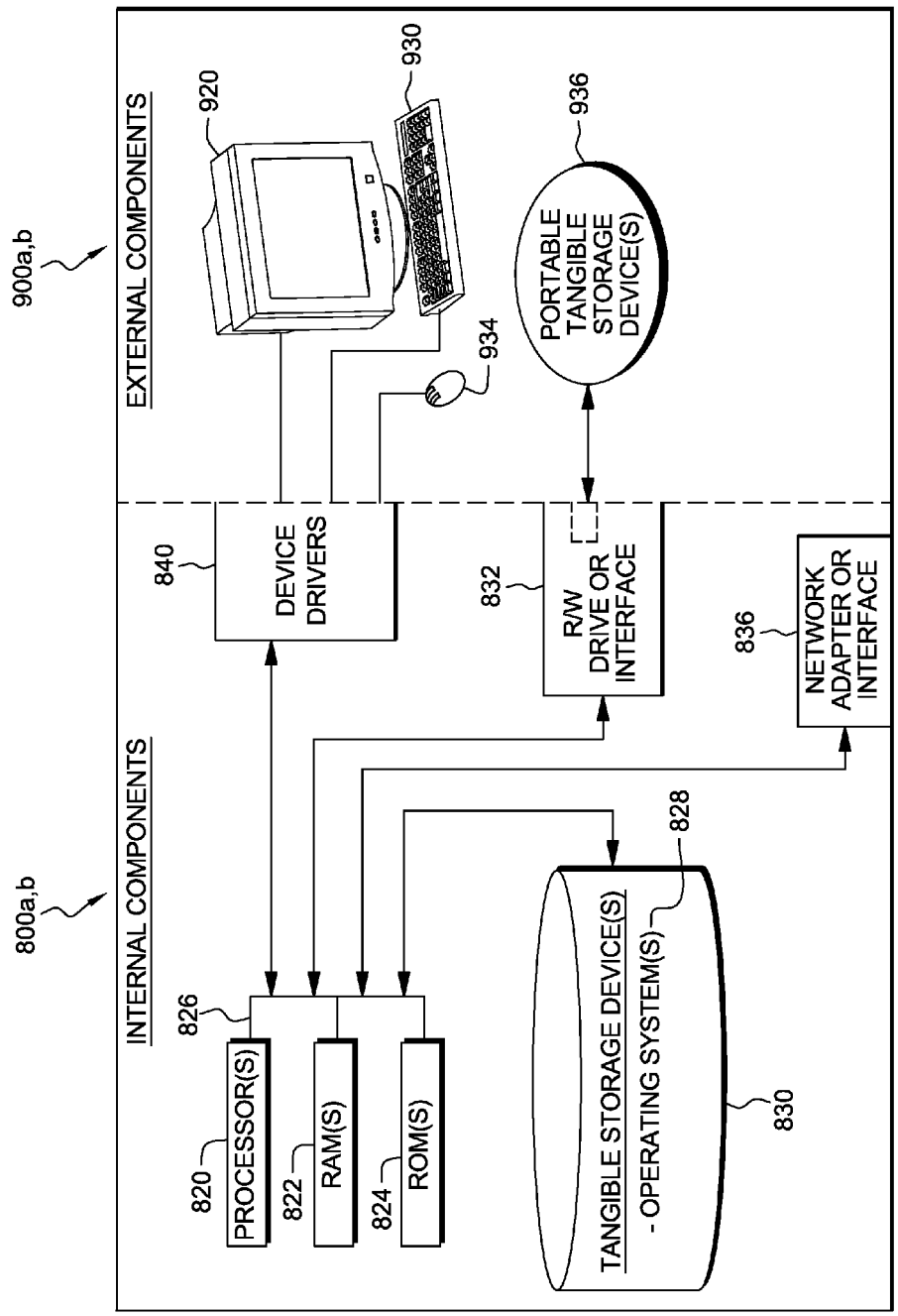
FIG. 3 is a block diagram depicting internal and external components of the first computer and the second computer of FIG. 1 according to an embodiment of the present invention.

FIG. 3 is a block diagram depicting a set of internal components 800a and 800b and a set of external components 900a and 900b that correspond to respective first computer 105a and second computer 105b. Internal components 800a and 800b each include one or more processors 820, one or more computer readable RAMs 822 and one or more computer readable ROMs 824 on one or more buses 826, and one or more operating systems 828 and one or more computer readable tangible storage devices 830. The one or more operating systems 828, and authorization code generator program module 120 on first computer 105a; and authorization code verification program module 125 on second computer 105b are stored on one or more of the respective computer readable tangible storage devices 830 for execution by one or more of the respective processors 820 via one or more of the respective RAMs 822 (which typically include cache memory). In the embodiment illustrated in FIG. 3, each of the computer readable tangible storage devices 830 is a magnetic disk storage device of an internal hard drive. Alternatively, each of the computer readable tangible storage devices 830 is a semiconductor storage device such as ROM 824, EPROM, flash memory or any other computer readable tangible storage device that can store a computer program and digital information.

Each set of internal components 800a and 800b includes a R/W drive or interface 832 to read from and write to one or more portable computer readable tangible storage devices 936 such as CD-ROM, DVD, memory stick, magnetic tape, magnetic disk, optical disk or semiconductor storage device. Authorization code generator program module 120 on first computer 105a; and authorization code verification program module 125 on second computer 105b can be stored on one or more of the respective portable computer readable tangible storage devices 936, read via the respective R/W drive or interface 832 and loaded into the respective hard drive or computer readable tangible storage device 830.

Furthermore, each set of internal components 800a and 800b also includes a network adapter or interface 836 such as TCP/IP adapter card, wireless wi-fi interface card, or 3G or 4G wireless interface card or other wired or wireless communication link. Authorization code generator program module 120 on first computer 105a; and authorization code verification program module 125 on second computer 105b can be downloaded to respective first computer 105a and second computer 105b from an external computer or external storage device via a network (for example, the Internet, a LAN, or a WAN) and respective network adapters or interfaces 836. From the network adapter or interface 836, floor Authorization code generator program module 120 on first computer 105a; and authorization code verification program module 125 on second computer 105b are loaded into at least one respective hard drive or computer readable tangible storage device 830. The network may comprise copper wires, optical fibers, wireless transmission, routers, firewalls, switches, gateway computers and/or servers.

Each set of external components 900a and 900b can include a computer display monitor 920, a keyboard 930, and a computer mouse 934. External components 900a and 900b can also include touch screens, virtual keyboards, touch pads, pointing devices, and other human interface devices. Each set of internal components 800a and 800b also includes device drivers 840 to interface to computer display monitor 920, keyboard 930 and computer mouse 934. The device drivers 840, R/W drive or interface 832 and network adapter or interface 836 comprise hardware and software in which the software is stored in computer readable tangible storage device 830 and/or ROM 824.

It should be appreciated that FIG. 3 provides only an illustration of one implementation and does not imply any limitations with regard to the environments in which different embodiments may be implemented. A variety of modifications to the depicted environments may be implemented. Moreover, a variety of modifications to the depicted environments may be made based on design and implementation requirements.

In accordance with the foregoing, a method, a computer system, and a computer program product have been disclosed for authorizing a change within a computer system by an end user associated with a change authorization code. However, numerous modifications substitutions can be made without deviating from the scope of an embodiment of the invention. Therefore, one or more embodiments of the invention have been disclosed by way of example and not limitation.

What is claimed is:

1. A method for authorizing a change within a computer system by an end user associated with a change authorization code comprising:

generating on a first computer within the computer system a unique key for a computer software application, wherein the computer software application is on a second computer within the computer system and is configured to participate in a change management process implemented via use of change management software on the first computer;

generating on the first computer an authorization code that grants an end user access to implement a change to a configuration item on a second computer during a configurable time period, comprising:

retrieving a unique identifier for the end user, a start time of the change, and an end time of the change;

rounding down the start time of the change to nearest five minutes, and up the end time of the change to nearest five minutes; and combining a copy of the unique identifier for the end user with the start time of the change that is rounded down in order to form a first prefix message, and separately a copy of the unique identifier for the end user with the end time of the change that is rounded up in order to form a second prefix message;

verifying, by the second computer, the authorization code inputted into the second computer to determine if the end user has authority to implement the change on the second computer, wherein the authorization code is separated into a first string and a second string each having a fixed number of bits; and granting, by the second computer, access to the end user to implement the change to the configuration item on the second computer if the end user has the authority to implement the change.

2. The method of claim 1, wherein the step of generating on the first computer the authorization code further comprises:

generating a first hash value with the unique key and a hash function having the first prefix message as input, and a second hash value with the unique key and the hash function having the second prefix message as input;

adjusting the first hash value into a first string having the fixed number of bits, and the second hash value into a second string also having the fixed number of bits; and concatenating the first string and the second string to form a third string that is the authorization code having twice the fixed number of bits.

3. The method of claim 2, wherein the step of adjusting comprises at least one of concatenating and truncating the first hash value into the first string having the fixed number of bits, as well as the second hash value into the second string also having the fixed number of bits.

4. The method of claim 1, wherein the step of verifying the authorization code inputted into the second computer comprises:

identifying a change time period threshold;

separating the authorization code into a first string and a second string each having the fixed number of bits;

retrieving a unique identifier of the end user and current time of the computer system;

combining a first copy of the unique identifier for the end user with a rounded down version of the current time of the computer system to form a first prefix message, and a second copy of the unique identifier for the end user with a rounded up version of the current time of the computer system to form a second prefix message;

generating a first hash value via use of the unique key generated and a hash function having the first prefix message as input, and a second hash value via use of the unique key generated and the hash function having the second prefix message as input; and determining the end user has the authority to implement the change, wherein the first hash value matches with the first string, and the second hash value matches with the second string.

5. A computer program product for authorizing a change within a computer system by an end user associated with a change authorization code comprising:

a non-transitory computer readable storage medium and program instructions stored on the non-transitory computer readable storage medium, the program instructions comprising:

program instructions to generate on a first computer within the computer system a unique key for a computer software application, wherein the computer software application is on a second computer within the computer system and is configured to participate in a change management process implemented via use of change management software on the first computer;

program instructions to generate on the first computer an authorization code that grants an end user access to implement a change to a configuration item on a second computer during a configurable time period, comprising:

program instructions to retrieve a unique identifier for the end user, a start time of the change, and an end time of the change;

program instructions to round down the start time of the change to nearest five minutes, and up the end time of the change to the nearest five minutes; and program instructions to combine a copy of the unique identifier for the end user with the start time of the change that is rounded down in order to form a first prefix message, and separately a copy of the unique identifier for the end user with the end time of the change that is rounded up in order to form a second prefix message;

program instructions to verify, by the second computer, the authorization code inputted into the second computer to determine if the end user has authority to implement the change on the second computer, wherein the authorization code is separated into a first string and a second string each having a fixed number of bits; and program instructions to grant, by the second computer, access to the end user to implement the change to the configuration item on the second computer if the end user has the authority to implement the change.

6. The computer program product of claim 5, wherein the program instructions to generate on the first computer the authorization code further comprises:
   program instructions to generate a first hash value with the unique key and a hash function having the first prefix message as input, and a second hash value with the unique key and the hash function having the second prefix message as input;
   program instructions to adjust the first hash value into a first string having the fixed number of bits, and the second hash value into a second string also having the fixed number of bits; and
   program instructions to concatenate the first string and the second string to form a third string that is the authorization code having twice the fixed number of bits.

7. The computer program product of claim 6, wherein the program instructions to adjust further comprises at least one of program instructions to concatenate and program instructions to truncate the first hash value into the first string having the fixed number of bits, as well as the second hash value into the second string also having the fixed number of bits.

8. The computer program product of claim 5, wherein the program instructions to verify the authorization code inputted into the second computer comprises:
   program instructions to identify a change time period threshold;
   program instructions to separate the authorization code into a first string and a second string each having the fixed number of bits;
   program instructions to retrieve a unique identifier of the end user and current time of the computer system;
   program instructions to combine a first copy of the unique identifier for the end user with a rounded down version of the current time of the computer system to form a first prefix message, and a second copy of the unique identifier for the end user with a rounded up version of the current time of the computer system to form a second prefix message;
   program instructions to generate a first hash value via use of the unique key generated and a hash function having the first prefix message as input, and a second hash value via use of the unique key generated and the hash function having the second prefix message as input; and
   program instructions to determine the end user has the authority to implement the change, wherein the first hash value matches with the first string, and the second hash value matches with the second string.

9. A computer system for authorizing a change within a computer system by an end user associated with a change authorization code comprising:
   a non-transitory computer readable storage medium and program instructions stored on the non-transitory computer readable storage medium, the program instructions comprising:
   program instructions to generate on a first computer within the computer system a unique key for a computer software application, wherein the computer software application is on a second computer within the computer system and is configured to participate in a change management process implemented via use of change management software on the first computer;
   program instructions to generate on the first computer an authorization code that grants an end user access to implement a change to a configuration item on a second computer during a configurable time period,
   program instructions to retrieve a unique identifier for the end user, a start time of the change, and an end time of the change;
   program instructions to round down the start time of the change to nearest five minutes, and up the end time of the change to nearest five minutes; and
   program instructions to combine a copy of the unique identifier for the end user with the start time of the change that is rounded down in order to form a first prefix message, and separately a copy of the unique identifier for the end user with the end time of the change that is rounded up in order to form a second prefix message;
   program instructions to verify, by the second computer, the authorization code inputted into the second computer to determine if the end user has authority to implement the change on the second computer, wherein the authorization code is separated into a first string and a second string each having a fixed number of bits; and
   program instructions to grant, by the second computer, access to the end user to implement the change to the configuration item on the second computer if the end user has the authority to implement the change.

10. The computer system of claim 9, wherein the program instructions to generate on the first computer the authorization code further comprises:
    program instructions to generate a first hash value with the unique key and a hash function having the first prefix message as input, and a second hash value with the unique key and the hash function having the second prefix message as input;
    program instructions to adjust the first hash value into a first string having the fixed number of bits, and the second hash value into a second string also having the fixed number of bits; and
    program instructions to concatenate the first string and the second string to form a third string that is the authorization code having twice the fixed number of bits.

11. The computer system of claim 10, wherein the program instructions to adjust further comprises at least one of program instructions to concatenate and program instructions to truncate the first hash value into the first string having the fixed number of bits, as well as the second hash value into the second string also having the fixed number of bits.

12. The computer system of claim 9, wherein the program instructions to verify the authorization code inputted into the second computer comprises:
    program instructions to identify a change time period threshold;
    program instructions to separate the authorization code into a first string and a second string each having the fixed number of bits;
    program instructions to retrieve a unique identifier of the end user and current time of the computer system;
    program instructions to combine a first copy of the unique identifier for the end user with a rounded down version of the current time of the computer system to form a first prefix message, and a second copy of the unique identifier for the end user with a rounded up version of the current time of the computer system to form a second prefix message;
    program instructions to generate a first hash value via use of the unique key generated and a hash function having the first prefix message as input, and a second hash value via use of the unique key generated and the hash function having the second prefix message as input; and program instructions to determine the end user has the authority to implement the change, wherein the first hash value matches with the first string, and the second hash value matches with the second string.

\* \* \* \* \*